2 Sheets--Sheet 1.

L. P. HOYT.
Feed-Rollers for Planers.

No. 147,397. Patented Feb. 10, 1874.

WITNESSES:
Jas. E. Hutchinson
John R. Young

INVENTOR.
L. P. Hoyt, by
Prindle & Deane, his Attys

2 Sheets--Sheet 2.

L. P. HOYT.
Feed-Rollers for Planers.

No. 147,397. Patented Feb. 10, 1874.

WITNESSES: Jas. E. Hutchinson, John R. Young

INVENTOR. L. P. Hoyt, by Prindle and Deane his Attys

UNITED STATES PATENT OFFICE.

LUCIUS P. HOYT, OF AURORA, ILLINOIS, ASSIGNOR TO HOYT & BROTHER MANUFACTURING COMPANY, OF SAME PLACE.

IMPROVEMENT IN FEED-ROLLERS FOR PLANERS.

Specification forming part of Letters Patent No. 147,397, dated February 10, 1874; application filed January 8, 1874.

*To all whom it may concern:*

Be it known that I, LUCIUS P. HOYT, of Aurora, in the county of Kane and in the State of Illinois, have invented certain new and useful Improvements in Feed-Rollers for Wood-Planers; and do hereby declare that the following is a full, clear, and exact description thereof, reference being had to the accompanying drawings making a part of this specification, in which—

Figure 1:
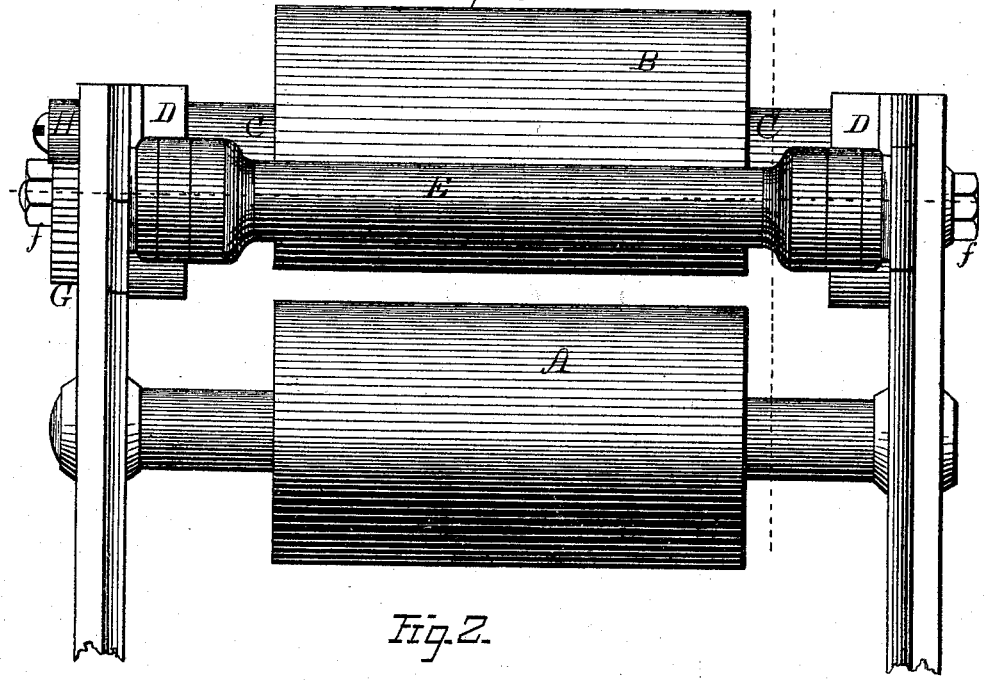
Figure 2:
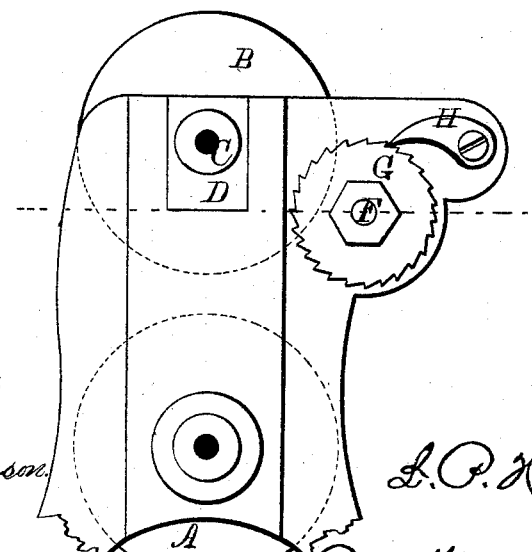
Figure 3:
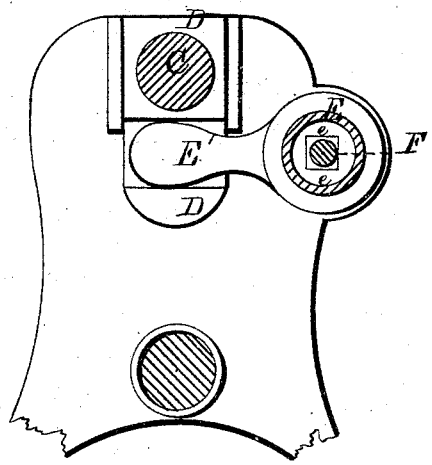
Figure 4:
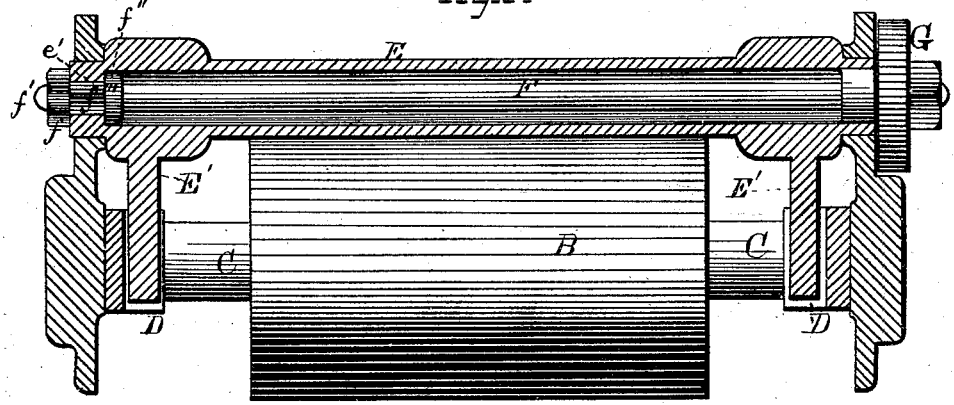

Figure 1 is a front elevation of my feed-rollers as constructed and combined. Fig. 2 is an end elevation of the same; and Figs. 3 and 4 are sections upon lines $x\,x$ and $z\,z$, respectively, of Figs. 1 and 2.

Letters of like name and kind refer to like parts in each of the figures.

The design of my invention is to enable the parallelism of the feed-rollers to be at all times maintained, and their inward pressure to be easily and quickly adjusted; to which end it consists, principally, in the means employed for insuring the parallelism of the rollers by combining, with the journal-boxes of the movable roller, the radial parallel arms of a rock-shaft, that is journaled, with its axis, in a line parallel to that of said roller, substantially as is hereinafter specified. It consists, further, in the means employed for producing an inward pressure of said rollers, consisting of the torsion-spring, operating through the rock-shaft, substantially as is hereinafter shown. It consists, finally, in the combined parallelism and pressure devices when constructed and operating in the manner and for the purpose substantially as is hereinafter set forth.

In the annexed drawings, A represents the lower or vertically-stationary roller, journaled in a horizontal position within suitable bearings, and capable of a rotary motion within a vertical plane. Immediately above the roller A is placed a second roller, B, the journals of which, C, rest within boxes D, that are arranged to move vertically within suitable guides, so as to permit the space between said rollers to be increased or diminished, as may be required. At one side, and slightly below the center of and parallel with the roller B, is journaled a rock-shaft, E, that is provided, near each end, with a radial arm, E', which arm, at its outer end, is connected to or with the corresponding journal-box D in such a manner as to preserve a close connection, and cause it to move vertically with the same, and thereby produce a semi-rotary movement of said shaft. As thus arranged, it will be seen that each journal-box, as it changes position, causes the rock-shaft to be rotated, and the opposite journal-box to be correspondingly raised or depressed, so that it is rendered impracticable for the upper roller B to get out of line with the lower roller A, even though the outward or inward pressure upon said rollers is exerted entirely at one end.

Pressure is applied to the upper roller and regulated by the following-described means: In and through the center, longitudinally, of the rock-shaft E is provided an opening, $e$, which is round transversely, except at one end, $e'$, where, for a short distance, a square form is given. Within the opening thus formed is placed a steel bar, F, that, near one end, corresponds to and fits within the squared portion $e'$, and is held in longitudinal position by means of a nut, $f$, which screws inwardly over the projecting threaded end $f'$ of said bar, and against the end of the shaft E, and draws a shoulder or collar, $f''$, which terminates the squared portion $f'''$ of said bar, outward against the inner end of said contracted or squared portion $e'$ of said opening. The outer or free end of the bar F substantially fills the end of the opening $e$, and upon the same, immediately outside the end of the shaft E, is secured a toothed or ratchet wheel, G, with which latter is caused to engage a pawl, H, that is pivoted upon the frame, and, in connection therewith, prevent said bar from turning in a direction upward and outward from the roller B. If, now, the movable roller be raised, so as to revolve the rock-shaft within its bearings, it will be seen that the rod or bar F will be twisted longitudinally, and that if said bar is tempered so as to form of it a spring, it will offer a greater or less amount of resistance to the motion of said shaft, dependent upon its size and the amount of torsional strain given to it while the rollers are in a normal position, said spring operating to press said movable roller downward, so as to closely confine any article placed between the same and the lower roller. By placing a wrench upon the ratchet-wheel G or the end of the spring F, and turning the same upward and toward the movable roller, the tension of said spring may be increased at will, while, by raising the pawl H and permitting said wrench to turn downward and forward, the tension of said spring can be partially or wholly relieved.

Having thus fully set forth the nature and merits of my invention, what I claim as new is—

1. In combination with the journal-boxes D of the roller B, the rock-shaft E, having its axis parallel to that of said roller, and provided with parallel radial arms E', that are connected with said boxes, substantially as and for the purpose specified.

2. The spring F, placed within the rock-shaft E, secured at one end to said shaft, and provided, at its opposite free end, with a ratchet-wheel, G, which engages with a pawl, H, in combination with said rock-shaft, its arms E', and the journal-boxes D, substantially as and for the purpose shown.

3. The rollers A and B, the boxes D, the rock-shaft E and E', the torsion-spring F, the ratchet-wheel G, and the pawl H, when said parts are constructed and combined to operate in the manner and for the purpose substantially as set forth.

In testimony that I claim the foregoing I have hereunto set my hand this 31st day of December, 1873.

LUCIUS P. HOYT.

Witnesses:
F. F. SMITH,
ISAAC L. HILT.